(12) United States Patent
Grant

(10) Patent No.: US 6,955,163 B2
(45) Date of Patent: Oct. 18, 2005

(54) FUEL/NITROUS OXIDE INJECTION PLATE

(76) Inventor: Barry S. Grant, Rte. 1, Box 1900, Dahlonega, GA (US) 30533

( * ) Notice: Subject to any disclaimer, the term of this patent is extended or adjusted under 35 U.S.C. 154(b) by 0 days.

(21) Appl. No.: 10/735,139

(22) Filed: Dec. 12, 2003

(65) Prior Publication Data
US 2004/0155122 A1 Aug. 12, 2004

Related U.S. Application Data
(60) Provisional application No. 60/433,115, filed on Dec. 13, 2002.

(51) Int. Cl.⁷ .............................................. F02B 23/00
(52) U.S. Cl. ...................................... 123/585; 123/531
(58) Field of Search ................................. 123/585, 531

(56) References Cited
U.S. PATENT DOCUMENTS 2,013,737 A * 9/1935 Swan ..................... 123/184.39
5,743,241 A * 4/1998 Wood et al. ................. 123/585
6,269,805 B1    8/2001 Wilson ........................ 123/585
6,561,172 B1 * 5/2003 Chestnut et al. ............ 123/585

* cited by examiner

Primary Examiner—Noah P. Kamen
(74) Attorney, Agent, or Firm—Thomas, Kayden, Horstemeyer & Risley, LLP

(57) ABSTRACT

The nitrous oxide injection tube 18 is formed with delivery ports 24 that include interior bores 38 that communicate with the internal passage 26 of the injection tube and larger external bores 40 that extend through the exterior surface 27 of the injection tube. The external bores are each angled toward the position of the entrance of a fuel runner that communicates with a cylinder of a combustion engine so that the nitrous oxide and the fuel carried by it are more uniformly distributed to each cylinder.

9 Claims, 4 Drawing Sheets

FUEL/NITROUS OXIDE INJECTION PLATE

CROSS REFERENCE

The benefit of Provisional Patent Application Ser. No. 60/433,115 filed Dec. 13, 2002 is claimed.

FIELD OF THE INVENTION

This invention relates generally to a fuel and nitrous oxide injection plate for injecting the fuel and nitrous oxide into the stream flowing from the carburetor to the inlets of the runners to the internal combustion engine of an automobile.

BACKGROUND OF THE INVENTION

In order to provide more power with an internal combustion engine without changing any of its integral components, such as cam shafts, cylinder heads, pistons, etc., it is possible to supply a larger volume of oxygen and fuel at the proper ratio to the cylinders. The induction of this larger volume of oxygen/fuel mixture produces more power because on each cycle of the engine more oxygen and fuel is available to be burned, which has a direct relationship to the power output generated by the engine.

This can be done in several ways, such as by using turbo-chargers and blowers to increase the inlet pressure of the fuel/air mixture delivered to the combustion cylinders, or by injecting nitrous oxide into the runners that carry the mixture to the cylinders so as to increase the amount of oxygen delivered to the combustion cylinders. Both turbos and blowers induce a mixture of fuel and atmospheric air to move at higher pressure to the cylinders. The least costly of these procedures is the use of nitrous oxide injection.

As shown in U.S. Pat. No. 6,269,805, fuel and nitrous oxide injection plates have been placed between the carburetor and the runners that lead to the cylinders of an internal combustion engine. Typically, the injection plate is substantially rectangular and defines a large central opening through which the stream from the carburetor to the engine passes. Typically, a nitrous oxide injector tube extends across the central opening, outlet ports are formed at intervals along the tube, and nitrous oxide at a pressure of approximately 1000 psi is delivered to the injection tube. The high pressure nitrous oxide is emitted from the delivery ports at intervals across the stream, with the nitrous oxide entering the injection tubes in the form of a liquid and immediately vaporizing as its pressure drops upon exiting the delivery ports. This creates turbulence in the stream passing from the carburetor to the engine, and generally distributes the nitrous oxide in the stream.

A second injection tube, a fuel injection tube, is positioned parallel to and downstream of the nitrous oxide injection tube for the purpose of delivering fuel, such as gasoline, to the stream. The outlet ports from the fuel injection tube are likely to be angled more laterally than the outlet ports of the nitrous oxide injection tube, thereby promoting the mixing of the fuel with the nitrous oxide.

In a high performance internal combustion engine, usually there are eight cylinders and pistons, and there are runners that extend from the vicinity of the carburetor to the cylinders, and the fuel/air/nitrous oxide stream is moved from the injection plate into the runners for delivery to the cylinders. By using the nitrous oxide/fuel injection plate of the prior art, it is anticipated that additional oxygen and fuel would be passed through each cylinder, thereby increasing the power of the engine.

A problem with the prior art fuel/nitrous oxide injection plate is that the nitrous oxide and fuel is not delivered in equal amounts to each runner for each cylinder, and some cylinders run lean while other cylinders run rich. This causes a difference in power generated from each cylinder and results in some cylinders running hotter than others.

The configuration of the inlets of the runners to an internal combustion engine will differ from engine to engine, so that the use of a standard sized and shaped injection plate for all engines typically will not result in equal distribution of the injected nitrous oxide and fuel to all runners and their cylinders.

It is to the above noted inadequacies of the prior art that this invention is directed.

SUMMARY OF THE INVENTION

Briefly described, the present invention comprises an injection plate for injecting nitrous oxide and fuel into the inlets of the runners of an internal combustion engine in a manner that substantially equalizes the amount of nitrous oxide and fuel entering each runner. The fuel injection plate includes a pair of injector tubes, one tube being a nitrous oxide injection tube and the other tube being a fuel injection tube, with the tubes extending across the inner opening of the injection plate, parallel to each other, with the nitrous oxide injection tube positioned upstream from the fuel injection tube. Nitrous oxide in liquid form is delivered to the nitrous oxide injection tube, and as the nitrous oxide emerges from the delivery ports of its tube and immediately vaporizes and radically expands and moves at high velocity with the stream flowing from the carburetor, adding oxygen to the stream. In the meantime, the fuel is delivered in liquid form to the fuel injection tube and emerges from its delivery ports and mixes with the nitrous oxide.

The delivery ports of at least the nitrous oxide injection tube are formed so that the nitrous oxide emitted from each delivery port flows toward a particular one of the inlets of a runner leading to the engine. Likewise, the fuel delivery ports of the fuel injection tube can be configured so as to deliver the streams of fuel into the streams of nitrous oxide and toward the inlet of the fuel runner that is to receive the nitrous oxide.

In the preferred embodiment, the delivery ports of the nitrous oxide injection tube are formed with an internal bore intersecting the internal tube passage of the injection tube and an external bore intersecting the internal bore and the surface of the injection tube. The external bore is larger than the internal bore and is oriented at an axis that extends from the nitrous oxide tube in a direction that functions to move the nitrous oxide stream toward one of the runners of the engine.

The external bores of the nitrous oxide delivery ports are larger that the internal bore and the nitrous oxide begins its expansion from its liquid state into its gaseous state and increases in velocity as it moves through the larger external bore.

Likewise, the fuel delivery ports of the fuel injection tube can be formed in the same manner, with the first bore extending from the internal passage of the tube, and the second bore extending inwardly from the outer surface of the tube and intersecting the first bore, with the second bore properly angled for delivery of the fuel in a direction that is aimed toward the inlet of a runner leading to a cylinder of the engine. Because the pressure at which the nitrous oxide passes from its delivery ports is so much higher than the pressure of the fuel, it is more important to properly orient the nitrous oxide delivery ports to emit their streams toward the inlets of the runners.

DETAILED DESCRIPTION

Figure 1:
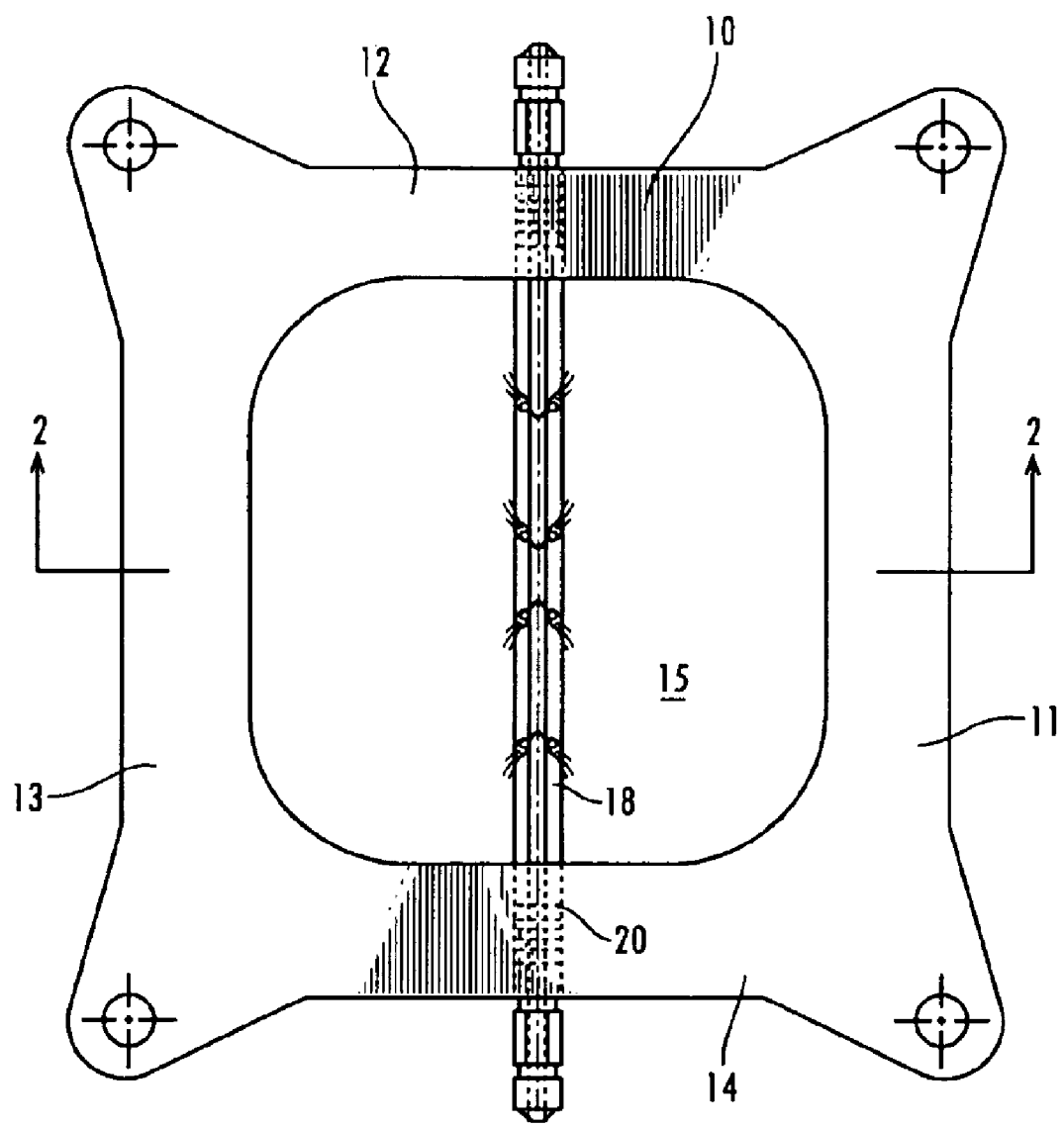
FIG. 1 is a plan view of the fuel and nitrous oxide injection plate.
Figure 2:
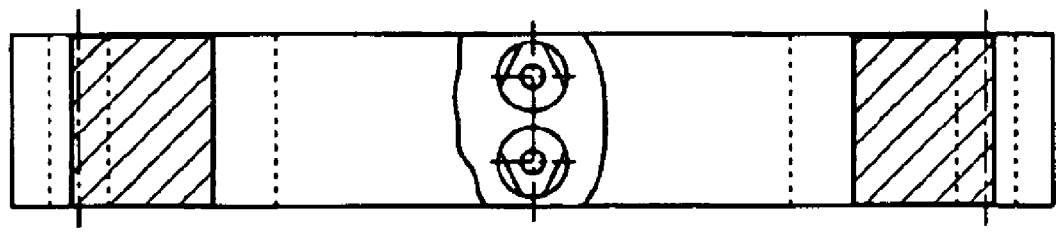
FIG. 2 is a side view of the injection plate of FIG. 1, taken across lines 2—2 of FIG. 1.

Referring now in more detail to the drawings in which like numerals indicate like parts throughout the several views, FIG. 1 illustrates an injection plate 10 that is in the form of a rectangle, frame-shaped, having side walls 11, 12, 13 and 14 that define a central passage 15 through which a stream of fuel and air passes from the carburetor, and then to the inlets of the runners 34 and 35 (FIGS. 7 and 8) that extend to the individual cylinders of the internal combustion engine (not shown). A nitrous oxide injection tube 18 extends across central passage 15, from side wall 12 to side wall 14, and a nitrous oxide supply port 20 extends through side wall 14 and communicates with the open end of the injection tube 18. This supplies nitrous oxide to the injection tube 18.

Likewise, fuel injection tube 22 extends across the passage 15, with its ends supported by side walls 12 and 14. A fuel supply port (not shown) similar to the nitrous oxide supply port 20 communicates through side wall 12 with the fuel injection tube 22, and supplies fuel to the fuel injection tube.

Figure 3:
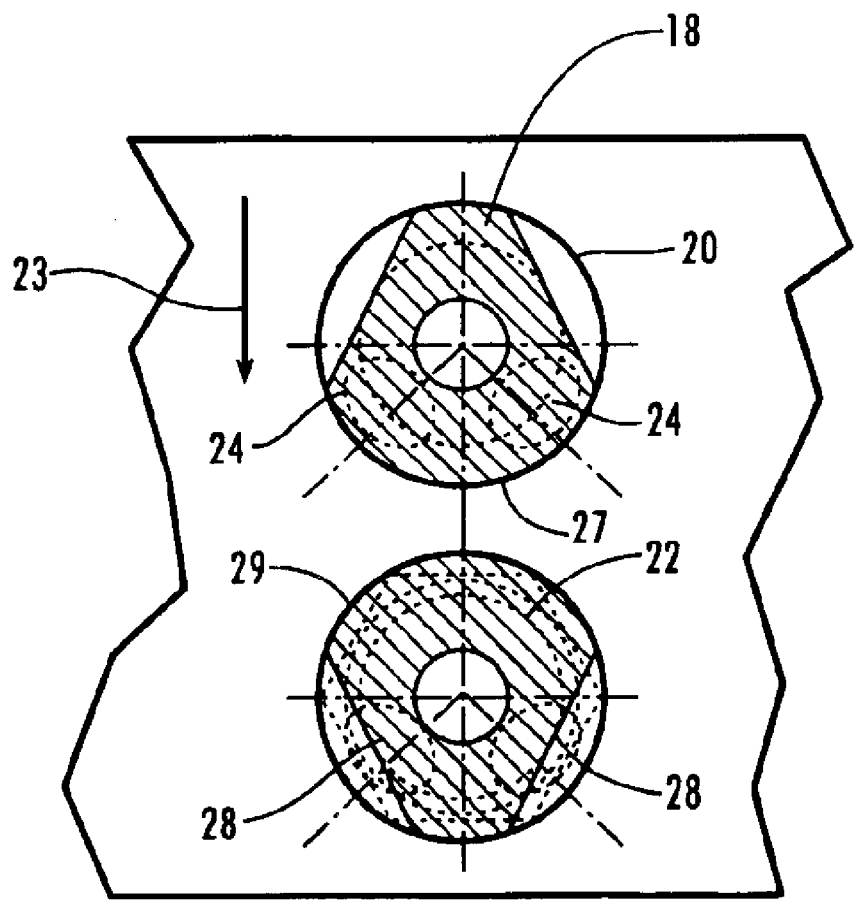
FIG. 3 is a cross-sectional view of the nitrous oxide injection tube and the fuel injection tube.
Figure 4:
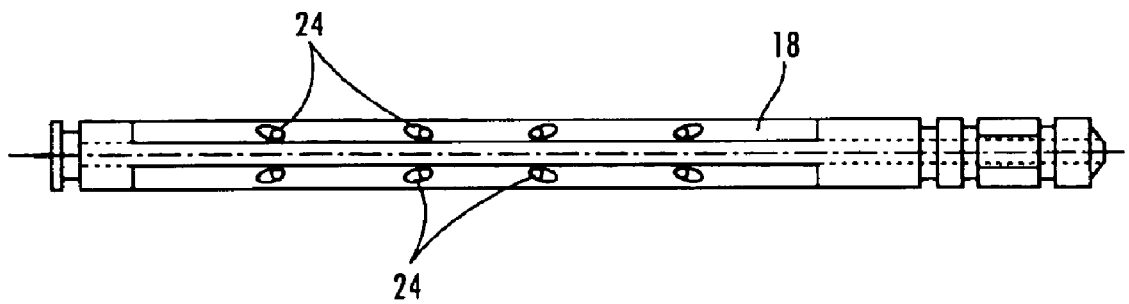
FIG. 4 is a top view of the nitrous oxide injection tube.
Figure 5:
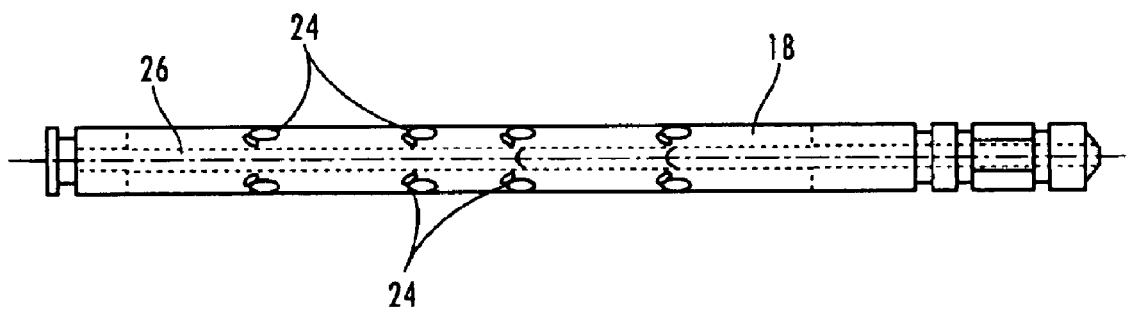
FIG. 5 is a bottom view of the nitrous oxide injection tube.

As illustrated in FIG. 3, the stream of fuel and air flowing from the carburetor moves in the direction of arrow 23, and the nitrous oxide injection tube 18 is positioned upstream of the fuel injection tube 22 and the tubes are parallel to one another.

As shown in FIG. 3, the nitrous oxide delivery ports 24 are formed through the exterior surface 27 of the nitrous oxide injection tube 18 and communicate with the internal passage 26 of the tube. Likewise, fuel delivery ports 28 extend through the exterior surface 29 of the fuel injection tube 22, in communication with the internal passage 30 of the fuel injection tube. The nitrous oxide delivery ports 24 are arranged in alignment along the length of the nitrous oxide injection tube 18 in two rows (FIG. 1), with the nitrous oxide delivery ports 24 being angled approximately 90° from each other (FIG. 3), inclined toward the fuel injection tube 22 so that delivery ports 24 direct a flow of nitrous oxide laterally of the fuel injection tube 22, straddling the fuel delivery tube, as illustrated in FIG. 3.

The fuel delivery ports 28 of the fuel injection tube 22 can be oriented at 180° angles from each other or sloped in the direction of movement of the nitrous oxide so as to direct the sprays of fuel laterally from the tube and into the streams of nitrous oxide. The fuel delivery ports are each paired with a nitrous oxide delivery port to enhance the mixing of the fuel with the nitrous oxide.

Figure 7:
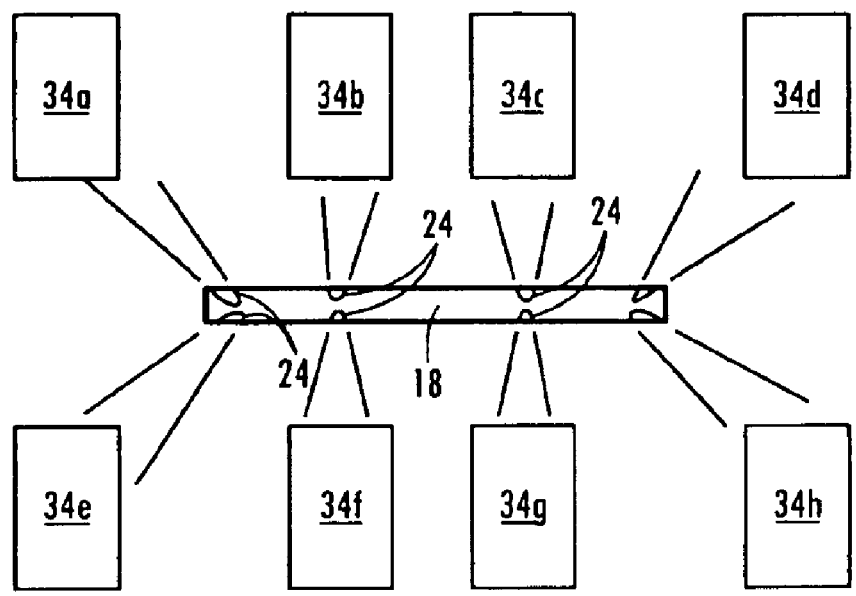
FIG. 7 is a schematic illustration of the uniformly positioned inlets to the runners that deliver the fuel and oxygen mixture to the cylinders of a combustion engine, and how the delivery ports of the injection tubes are angled toward them

As illustrated in FIG. 7, the inlets 34A–34H of the runners of the small block V8 Chevrolet engine are non-uniformly spaced from one another. For example, inlets 34B and 34C are closer together than the inlets 34A and 34B or than inlets 34C and 34D.

Figure 8:
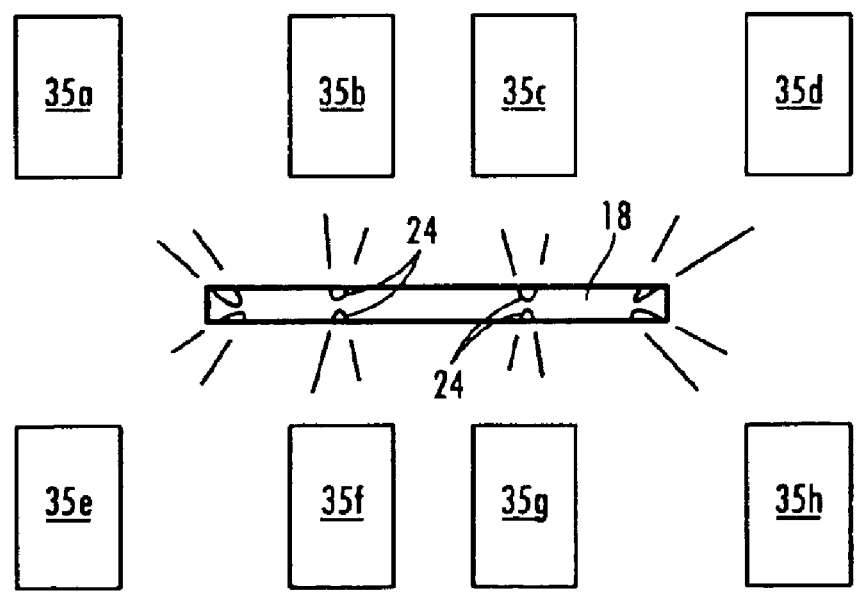
FIG. 8 is a schematic illustration, similar to FIG. 7 but showing different spacing between the inlets to the runners of some engines and how the delivery ports of the injection tubes are angled toward them.

However, FIG. 8 shows that the inlets 35A–35H to the runners of a large block V8 Chevrolet engine are more equally spaced apart.

In order to have the spray of nitrous oxide and fuel directed from one of the delivery ports 24 or 28 of the injection tubes 18 or 22 and delivered to a particular runner, the arrangement of the delivery ports will likely have to be different when used with different engines.

Figure 6:
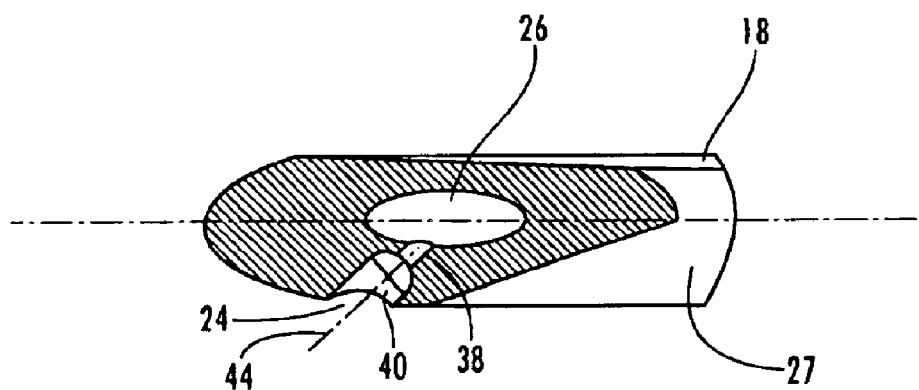
FIG. 6 is an angled cross section of the nitrous oxide injection tube, showing the delivery port.

As illustrated in FIG. 6, the nitrous oxide delivery ports 24 are formed in two stages, a first or internal bore 38 that communicates with the internal passage 26 of the nitrous oxide injector tube 18, and a second, larger external bore 40 that communicates with the first bore 38 and with the external surface 27 of the nitrous oxide injection tube 18. Typically, the larger external bore 40 will be formed first, by a ball nose end mill, and then the internal smaller bore 38 will be formed by a conventional drill bit. The ball nose end mill will be advanced into the nitrous oxide injection tube 18 with a movement indicated by axis 44 of FIG. 6, so that the configuration of the larger external bore 40 directs the movement of the nitrous oxide along the axis in a predetermined path from the nitrous oxide injection tube 18.

The angle at which the ball nose end mill can be advanced with respect to the nitrous oxide injection tube 18 can be varied, so as to vary the configuration of the larger external bores 40 for the purpose of controlling the pattern of the spray emitted from the nitrous oxide delivery ports 24. Generally, the axis 44 of the larger bore 40 will be directed toward one of the inlets of the runners that extend to a cylinder of the internal combustion engine of the vehicle. For example, the end most nitrous oxide delivery ports 24 would be directed toward the end most inlets 35A and 35B and 35E and 35H, whereas the intermediate nitrous oxide delivery ports would be directed toward the inlets 35B and 35C and 35F and 35G.

When determining the angle of the axis 44 of each larger bore 40 of the fuel injection tubes, the velocity of the stream passing from the carburetor and through the large central passage 15 of the injection plate 10 and moving to the inlets of the runners can be considered so that the influence of the stream on the nitrous oxide and fuel emitted into the stream must be accommodated.

Typically, the fuel will be passed to the fuel injection tubes at a much lower pressure, less than 10 psi as compared to approximately 1000 psi for the nitrous oxide, so that the directional influence of the fuel is significantly less than the directional influence of the nitrous oxide as emitted into and evaporating in the stream passing through the large central passage 15 of the injection plate 10. The bores of the fuel delivery ports can be similar in configuration to the nitrous oxide delivery ports but are likely to be a different size than the bores of the nitrous oxide delivery ports.

The nitrous oxide delivery ports 24 receive the nitrous oxide in liquid form and the pressure of the nitrous oxide drops as the nitrous oxide expands and increases in velocity as it passes through and beyond the larger external bore 40 of the delivery ports. The expanding nitrous oxide tends to follow the shape and angle of the external bore, and the shape and angle of each external bore projects the expanding nitrous oxide generally along the axis of the external bore and toward one of the inlets 34, 35 of the runners that lead to the engine.

Although a preferred embodiment of the invention has been disclosed in detail herein, it will be obvious to those skilled in the art that variations and modifications of the disclosed embodiment can be made without departing from the spirit and scope of the invention as set forth in the following claims.

I claim:

1. An injection plate for positioning in a stream of fuel and air moving from a carburetor to the inlets of fuel runners of an internal combustion engine for injecting fuel and nitrous oxide into the fuel runners, said injection plate comprising:
    a frame defining a frame opening for surrounding the stream moving from the carburetor, said frame having a fuel passage and a nitrous oxide passage;
    a fuel injection tube extending across said frame opening and mounted at its ends to said frame and having an external surface and an internal passage in communication with said fuel passage of said frame;
    a nitrous oxide injection tube extending across said frame opening and mounted at its ends to said frame and having an external surface and an internal passage in communication with said nitrous oxide passage of said frame;
    a plurality of nitrous oxide delivery ports formed in said nitrous oxide injection tube, each said nitrous oxide delivery port configured to direct nitrous oxide in a direction to flow toward the inlet of one of the runners, and
    wherein said nitrous oxide delivery ports are characterized by having been formed by a ball nose end mill and a rectilinear bit.

2. The injection plate of claim 1, wherein at least some of said plurality of nitrous oxide delivery ports of said nitrous oxide tube have a bore with an axis extending from said nitrous oxide tube in a direction to direct nitrous oxide toward one of the runners.

3. The injection plate of claim 2 wherein some of said nitrous oxide delivery ports are oriented with their axes slanted with respect to the longitudinal axis of said nitrous oxide injection tube.

4. The injection plate of claim 2, wherein said fuel injection tube and said nitrous oxide injection tube extend parallel to each other and are positioned in sequence along the stream.

5. The injection plate of claim 4, wherein the axes of said bores of said nitrous oxide delivery ports extend to opposite sides of said fuel injector tube.

6. The injection plate of claim 1, wherein each of said nitrous oxide delivery ports is configured to direct nitrous oxide in a direction to flow primarily toward a single one of the runners.

7. The injection plate of claim 1 and wherein said fuel injection tube includes a plurality of fuel delivery ports, each of said fuel delivery ports configured to direct fuel in a direction to flow with the nitrous oxide from one of said nitrous oxide delivery ports toward one of the runners.

8. The injection plate of claim 7, wherein said fuel delivery ports are characterized by having been formed by a ball nose end mill and a rectilinear bit.

9. The injection plate of claim 7, wherein at least some of said nitrous oxide delivery ports and said fuel delivery ports have a first bore intersecting its said tube passage and a second bore intersecting its said external surface, and said second bore is oriented toward one of the runners for directing flow to the runner.

* * * * *